June 12, 1956 L. W. PRAY 2,749,574
TEXTILE DRAWING ROLL
Filed Nov. 10, 1953
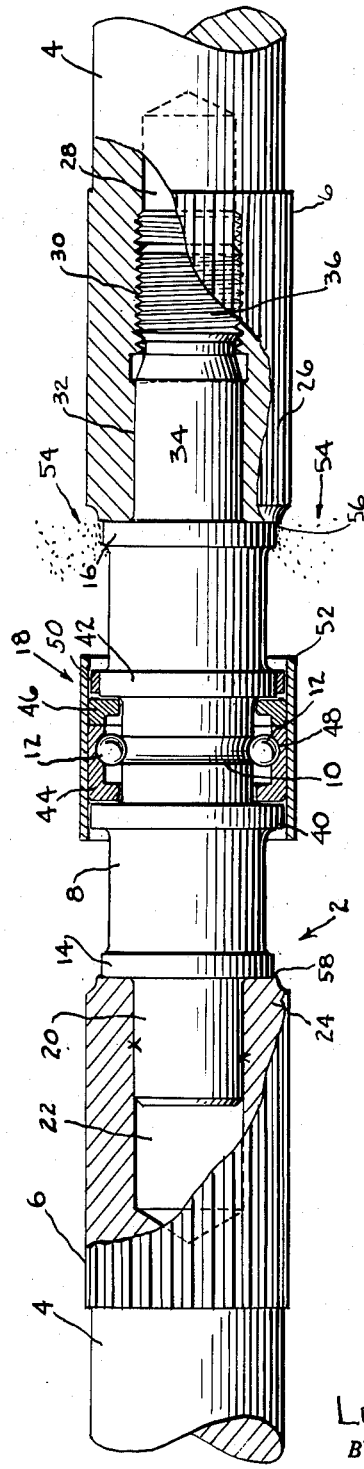
INVENTOR.
LESTER W. PRAY
BY *Martin Kirkpatrick*
ATTORNEY

United States Patent Office 2,749,574
Patented June 12, 1956

2,749,574

TEXTILE DRAWING ROLL

Lester W. Pray, Saco, Maine, assignor to Saco-Lowell Shops, Boston, Mass., a corporation of Maine Application November 10, 1953, Serial No. 391,203

4 Claims. (Cl. 19—141)

This invention relates to textile drawing rolls such as are commonly used in spinning, roving, and other textile machinery. More particularly it concerns such multi-unit rolls which are supported in rolling bearings with improved freedom from abrasive wear due to products of so-called "fretting" corrosion.

Textile drawing rolls are frequently as much as forty feet or more in total length, with diameters of the order of an inch or so. Such rolls are built up to any desired length by joining a multiplicity of units together, by means of axially alined mating threaded portions at the ends thereof.

In recent years it has become common practice to provide rolling bearing support means for such units. However, it has been observed that in use such bearings have been subject to rapid wearing out and breakdown.

A primary object of the present invention is to provide a multi-unit steel roll including a rolling bearing support, the bearing components of which are not subject to undue wear during use, and are characterized by long life and smooth operation.

In such units supported by rolling bearing means and heretofore in use, separate roll sections having working surfaces for drafting operations and the like have been provided with axially alined threaded recesses at each end thereof. Such roll sections have been connected up by means of coupling members provided at each end thereof with mating axially alined male threaded portions. The rolling bearing supports have been provided at said coupling members, and to save space on overall diameters, these coupling members have formed the inner races for the bearings. Accordingly, it has been necessary to make said coupling members of steel of bearing strength, much harder than the steel used for the roll sections. The coupling members have been provided with means for axially spacing the roll sections. These means were usually shoulders against which the roll ends butted, or tapered portions which matched tapered sections in the recesses of the rolls.

It is difficult, and as a practical matter impossible, to tap an internal thread so that its axis coincides with the axis of a roll section, with any great accuracy. Thus coupling members have been screwed into roll sections and brought into fairly good axial alinement therewith by bending the male threaded portion of the coupling member at the joint. This has of course produced high stress in said male threaded portion. At the same time it has encouraged relative movement between the threaded portions in the rotating drawing roll in use. Said relative movements under such high stress have resulted in so-called "fretting" corrosion, as have also relative movements between other contacting portions of the roll sections and coupling members. Furthermore, pressures applied to the rolls between bearings caused deflections of the steel rolls which accentuated this condition.

In rolling bearing mounted roll units heretofore known and used, the supporting bearings have been located in close juxtaposition to the openings of the annular crevices between the screwed-together coupling members and roll sections. In some cases so-called bearing area seals have been designed to seal off atmospheric dust, but have not only left such crevice openings adjacent the bearings, but have additionally sealed said openings off from the atmosphere and in with the bearings.

Generally speaking, I have discovered that major wear in said bearings is caused by formation between the threaded and other contacting portions of the roll sections and the couplings of minute particles of "fretting" corrosion products which are extremely abrasive, migration of said abrasive particles through the very, very narrow annular passages between roll sections recess and mating portion of coupling member and out through the openings or outlets of said passages, and further migration into the bearings themselves, where great damage is done to balls, or rollers, raceways, and moving parts generally. I have discovered further that such wear may be avoided by locating the bearings further away from said openings in such a manner that abrasive particles emerging therefrom are discharged harmlessly into the atmosphere or otherwise, away from said bearings. Of further assistance in avoiding such wear, I have found, is the practice of brazing, silver soldering, or otherwise integrally joining one end of each roll section to one end of each coupling member, to prevent coupling-section creep at half the joints therebetween and so cut down the amount of abrasive products of fretting corrosion formed in the first place.

Additional objects, features, and advantages of my invention will be apparent from the drawing and following description of a preferred embodiment thereof, wherein the figure is a broken-away side elevation, partially in section, of end portions of two units of a drawing roll and the ball bearing mounting of the coupling member of one of them.

Referring now to the figure, there is shown broken away a portion of a textile machine drawing roll made up of a multiplicity of roll units, one of which is indicated generally at 2. Each roll unit includes a roll section 4, having thereon working surfaces 6, and a coupling member 8.

The coupling member 8 is formed from a harder metal than the roll section 4, so that the circumferential groove 10 located centrally thereof may have hardness suitable to serve as the inner race for the balls 12.

Spaced on either side of the groove 10, and a substantial distance therefrom, are circumferential shoulders 14 and 16, against which the roll sections 4 abut so as to be spaced the desired distance from the bearing (indicated generally at 18) and from each other. Other spacing means, such as mating tapered portions internally of a roll section and externally of a coupling member, could be used.

Extending from the shoulder 14 is shank 20, which is accepted in a close fit by the blind hole 22 drilled in an end 24 of the roll section 4, the mating surfaces therebetween (as indicated by the letter "x") being integrally joined together by brazing or silver solder (not shown) to secure them against relative movement.

The opposite end 26 of each roll section 4 is provided with a deeper blind hole 28, which has a threaded portion 30 and a smooth portion 32 for accepting the shank extending outwardly from shoulder 16.

Connection is made between roll units by means of the threads 36 at the end of shank 34, which mate with the threaded portion 30 of roll section 4.

Adjacent the groove 10 on opposing sides thereof, are the shoulders 40 and 42, the latter being of smaller diameter than the former to facilitate assembly. Mounted around the coupling portion 8 and between said shoulders 40 and 42 are the two parts 44 and 46 making up the outer race of split ball bearing 18, part 44 actually carrying the outer raceway 48 for the balls 12. Around the shoulder 42 is a steel ring 50. The entire bearing 12 is enclosed by shell 52, and is supported in operation by suitable means (not shown). The steel ring 50 fills the gap between the small shoulder 42 and the shell 52. The balls 12 may suitably be held in place magnetically while the parts 44 and 46, which are split (not shown) in a plane parallel to their axis, are assembled thereover.

In operation, abrasive products indicated generally at 54 are formed, by fretting corrosion, between the threaded portion 30 of roll section 4 and the threads 36 on coupling member 8 and also between projection 34 and recess 32 and between shoulder 16 and the end 26 of the roll which abuts it. Said products migrate through the very small annular spaces between individual male and female threads, through the very small annular passage between smooth portion 32 and shank 34, through the very narrow crevice between abutting shoulder 16 and end 26, and out through outlet 56. However, because the space from outlet 56 to bearing 18 is of substantial width, and the particles 54 are unconfined therebetween to permit free dispersal thereof away from said bearing, such particles are dispersed before reaching the bearing, despite any tendencies of such particles to cling to the coupling member 8 and creep therealong. Such corrosion products are not a concern at the other coupling member-roll section interface 58, because of the integral joint between shank 20 and blind hole 22 and consequent absence of abrasive products found therebetween.

It will be understood from the above description that various expedients may be resorted to in order to space outlets of joints between coupling members and roll sections substantially further from the supporting ball or roller bearings, and facilitate free dispersal of materials converging from said outlets away from said bearings, so as to prevent migration of abrasive materials thereinto; and also to secure certain of said joints against movement of coupling portions and roll sections relative to one another. I do not wish to be understood as limiting my invention to the details disclosed, except as set forth in the appended claims.

I claim:

1. In a textile drawing roll having a plurality of roll units adapted to be supported for rotational movement, a roll unit adapted to be assembled in end-to-end relation with other such roll units to form said drawing roll and comprising a roll section and a coupling member, said roll section being united at a first end thereof to a first end of said coupling member to prevent relative movement therebetween in normal use, said coupling member including rolling bearing means and a shell disposed therearound to exclude atmospheric-borne particles, and having at the second end thereof surfaces for contacting an end of a roll section of a second such roll unit and being detachably secured thereto in end-to-end relation, said surfaces communicating with the atmosphere at locations spaced a substantial distance axially away from said shell to permit products of fretting corrosion formed as a result of relative movement in said detachable connection to escape into the atmosphere at the said locations without contaminating said rolling bearing means.

2. The roll unit of claim 1 in which said roll section is of softer metal than said coupling member.

3. The roll unit of claim 2 in which said second ends of said roll section and said coupling member are provided with complementary screw threads, whereby such roll units may be secured together thereby in end-to-end relation.

4. The roll unit of claim 3 in which said second end of said coupling member is additionally provided with a shoulder adapted to abut the end of the roll section of said second such roll unit upon assembly therewith, said shoulder being spaced axially away from said shell to permit said products of fretting corrosion formed from relative movement in normal use to escape into the atmosphere from any crevice between said shoulder and said end of said roll section of said second roll unit without contaminating said rolling bearing means.

References Cited in the file of this patent
UNITED STATES PATENTS

| | | |
|---|---|---|
| 1,104,270 | Pack | July 21, 1914 |
| 1,264,452 | Sylvander | Apr. 30, 1918 |
| 1,659,261 | Guillet | Feb. 14, 1928 |
| 1,989,439 | Ahearn | Jan. 29, 1935 |
| 2,530,094 | Stearns | Nov. 14, 1950 |
| 2,584,640 | Taylor | Feb. 5, 1952 |